Oct. 13, 1970 H. MARTIN ET AL 3,534,337

DATA ACQUISITION DEVICE

Filed April 27, 1967

INVENTORS:
Helmut Martin
Reinhard Ludwig

By Smyth, Roston & Pavitt

ATTORNEYS

United States Patent Office 3,534,337

Patented Oct. 13, 1970

3,534,337

DATA ACQUISITION DEVICE

Helmut Martin, Hannover, and Reinhard Ludwig, Kiel, Germany, assignors to Kabel- und Metallwerke, Gutehoffnungshutte, Hannover, Germany, a corporation of Germany Filed Apr. 27, 1967, Ser. No. 634,221
Claims priority, application Germany, Apr. 30, 1966, H 59,282
Int. Cl. G06c 9/00
U.S. Cl. 340—172.5 20 Claims

ABSTRACT OF THE DISCLOSURE

A data acquisition system is comprised of a central unit and of a plurality of stations for supplying data thereto. A cable leads from the central unit to each station which is connected to all lines in the cable. The stations are cyclically interrogated in that a station having terminated its supply calls on another station selected from those ready to supply data in a particular pattern.

Figure 1:
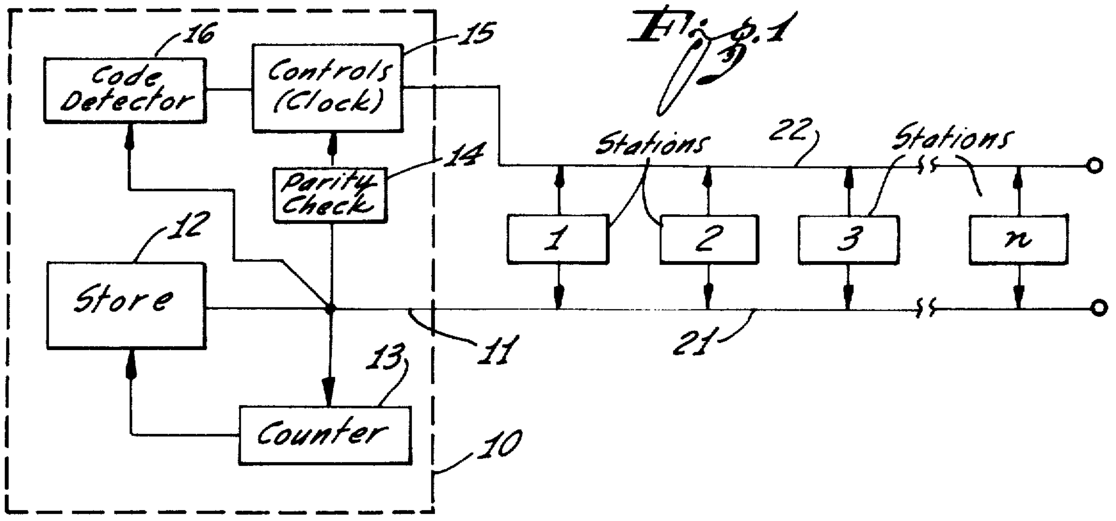

The present invention relates to a data acquisition device and system which comprises a central data acquisition unit and at least one, preferably a plurality, of peripheral stations constituting and including sources which furnish data to be passed to the central data acquisition unit.

The known data acquisition devices are usually constructed in that a connecting cable runs from the central unit to an individual source, whereby all the connecting lines in the cable are private to each station. Naturally, each cable leading from the central unit to either station has to include a complete set of lines needed for communication. These lines will include control connections and data channels. Thus, the total number of lines needed is the multiple of the number of lines per cable times the number of cables, i.e., stations. In the central unit there is provided a selector device such as a multiplex type switching arrangement which sequentially connects the individual lines in the cables and coming from the individual stations, to the input channels of the central unit. Thus, the multiplex provides a communication between a particular station furnishing data and, for example, the storage unit in the central unit to the exclusion of all other stations at that time. The multiplexing switch is usually triggered sequentially and the individual stations are, therefore, placed cyclically and sequentially in condition for communication with the central unit.

This type of system or device, however, has the disadvantage that there is a limitation as to the particular number of stations connectable to the unit, which number is determined by the number of possible connections for the multiplexer. Extension beyond the number of stations as originally contemplated involves, therefore, a basic structural change in the central unit. Another disadvantage is that one has to wire a separate cable from the central unit, i.e., the multiplex output thereof, to each one of the individual stations. Therefore, such a system is not very flexible, particularly with view to possible changes in the number and/or locations of stations.

It is an object of the present invention to provide for a data acquisition device and system which can be extended without requiring any modification in the central unit and without requiring additional cables and connections leading from the data acquisition center to the "new" stations. In accordance with the principal aspects and features of the present invention, the individual stations which respectively include the supply sources for the data to be passed on to central unit, are arranged along a transmission cable which accordingly leads from the central acquisition unit, for example, first to the station closest to it; from there to a second station selected, for example, from among the remaining stations, as the one which is closest to the first one; from there to a station closest to the second one, etc., and, while not essential, the cable can be run along a path of optimum shortness using minimum distance relationships throughout the entire system. One will choose to do so, if the stations are progressively farther from the central unit. The cable has a number of lines, which is independent from the number of stations, but depends only on the number of individual lines needed for data and control communication between any station by itself and the central unit. Therefore, the number of stations connectable to this cable can be changed at will.

The cable will include at least one data line which is common to all stations in that all stations feed their respective data supply into that line. If the data are being supplied in a parallel type format accordingly more data lines are needed. There exists the possibility that individual stations may provide data at a different format so that this data cable must have as many data lines as the maximum number of parallel information which may be provided by one or several of the stations. However, the format is generally fixed by the design and the operation of the central unit, so that additional stations must be compatible with the existing format and should not require, for example, an additional data line.

In addition, there is at least one control line required which leads also along the stations and which is needed for controlling the sequencing of operatively coupling the individual stations to the data line or lines. As will be developed below, that control line is also called progression control line and could lead from station-to-station in a closed loop. Hwever, it is preferred to make that control line a part of the main cable which runs from the central unit in a one-way manner to the last, i.e., farthest station.

Preferably each station is constructed to assume several modes, one of which is the operate mode, and during which the station, to the exclusion of others, is coupled to the data lines for feeding its data through the data lines to the central unit. The progression control line then controls the operative connection of the next station to the data line after the present station has terminated its supply operation. The progression runs in one direction, for example, from the closest to the farthest station constituting one cycle. The loop is operatively closed by control by and from the central station if the progression control line does not by itself form a physical loop connection. The central unit calls on the first station again after completion of a cycle, and the progression then continues from station-to-station in that each station calls on the next one, etc.

It is apparent that the number of stations connectable to the control and data lines is principally indefinite—an extension of the system may require an extension of the cable, i.e., from the previously last station to the newly added one, but it never requires completely new connections leading all the way from the center to the newly added station. In addition, the stations are constructed that the data lines and possibly other control lines needed for controlling additional modes of the individual stations from the central unit, need only to be tapped for connection of a station thereto, while only the progression control line is actually, physically interrupted at the location of a station; a serial switch controlled by the station is placed into that line permitting closing of the interrupted circuit. This switch is open when the progression control is to stop at that station, as the station will then supply data. When the switch is closed, the station will be passed over during that cycle, which point leads to the next aspect to be considered.

In accordance with other features of the invention, the individual stations may have another mode which can be described as a waiting mode. Each individual station can selectively be placed into the waiting mode. The purpose thereof is that not all stations will necessarily be sequentially placed into the operate mode, but only those actually desirous to feed data into the central unit; those which have no data available can be skipped over. Thus, if a station is ready for feeding data to the central unit it will be placed into the waiting mode first and then by progression control during the cyclic coupling process the station will be placed in the operate mode. The progression of coupling the stations to the central unit proceeds actually from one station (in the operate mode) to the next station in the waiting mode along the line of connection through the cable. A station which is not in the waiting mode will be left out during as many cycles for which it is not in the waiting mode.

By placing a station into the waiting mode a station enters a "waiting line" formed by all those stations which are also in the waiting mode. This provision is of advantage because each individual station can be placed into the waiting mode when ready. Thereafter nobody has to wait, nor are additional steps necessary to provide actually for operative coupling of certain stations of the data lines as by the automatic progression control the station will, in due course, be placed into the operate mode without any influence by the station itself. On the other hand, the cyclic interrogation process involves only those stations actually ready (i.e., in the waiting mode), a station not ready is not interrogated which saves time and reduces the waiting time for any station. Moreover, the placing of a station into the waiting mode does in no way interfere with any communication process then in progress.

Aside from the control line linking the stations serially for progression control, additional control lines in the cable may link the stations with the central unit for control of the stations and for signaling back to the central unit the progression. The stations are constructed that all of them receive the respective control signals, but only one at a time will be affected, for example, for terminating the operate mode. The extent of this control depends on the degree of autonomy afforded each station. The central unit may, for example, also control the rate of data supply by providing to the stations clock pulses. These may be received by all of them but will be effective only in the station which is in the operate mode.

As stated, the principal progression control is carried out in that along the cable a station, after having terminated its data supply, will issue a signal into the progression control line to place the next station along the cable which is in the waiting mode, into the operate mode. This progression could, but does not have to, be controlled in any manner from the central unit. It works preferably in one particular direction, for example, from the station closest to the central data acquisition unit to the station farthest therefrom or vice versa. One could, but this is not advisable, construct the unit that the progression runs alternatingly in the opposite direction. However, it is preferred to operate this system cyclically in one direction only in a true cyclic manner. After, for example, the last station along the line which was in the waiting mode, has been interrogated and supplied data to the central data acquisition unit, the first one is being coupled to the data acquisition unit if in the waiting mode. In this way, i.e., by one-way cycling the average waiting period for each station is equally long.

The average waiting period could be reduced by calling on the individual station in same sequence with which they have been set into the waiting mode. This, however, is advisable only if the resulting increase in cost for the system can be justified by the resulting reduction in the waiting time. In this case, the cable must include additional communication lines which are also connected to each of the stations and runs also from station-to-station. Each station, when in the waiting mode, issues an identification code into these addressing lines and the code is passed to and received by the central unit to be stored therein. The central unit then calls on the individual stations by direct addressing, either through the same addressing lines or a different, parallel system of addressing lines and in the same order the central unit has received identification codes from the several stations which in turn was the same sequence with which the stations had been placed into the waiting mode independently from their location.

Figure 2:
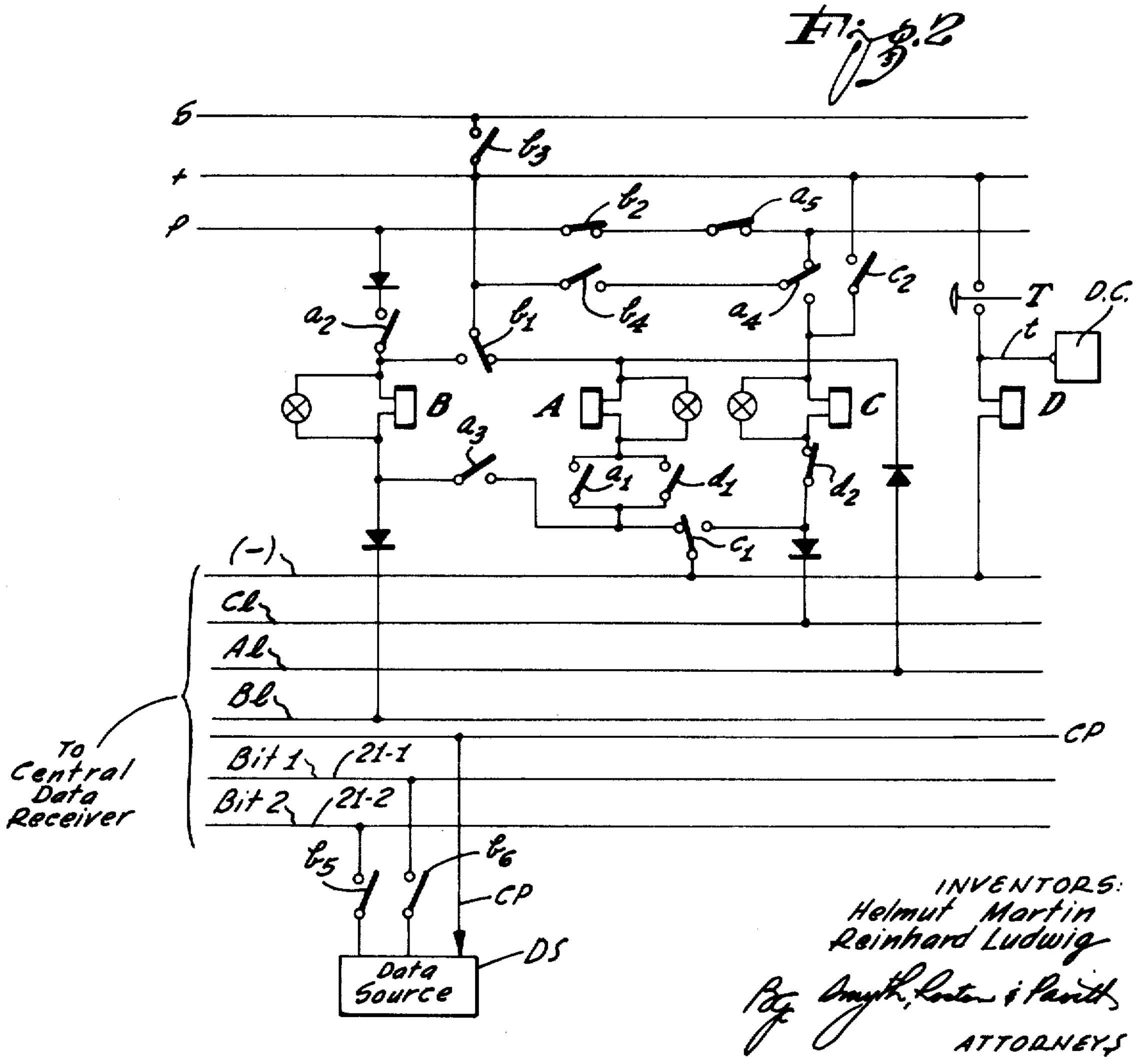

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawing in which:

FIG. 1 illustrates a block diagram representing somewhat schematically the general layout of a system in accordance with the present invention; and FIG. 2 illustrates a circuit diagram for an individual station which has a data supply source, and several of which are used in the system shown in FIG. 1.

Proceeding now to the detailed description of the drawings, in FIG. 1 thereof, reference numeral 10 denotes a general central data acquisition unit or central data receiver in the following briefly referred to as CDA unit. This unit 10 is to receive data from a plurality of different sources which may be positioned at different locations. The unit 10 may, for example, be or include a tape unit providing a punched tape in response to signals received. The unit 10, as far as important aspects relevant to the present invention is concerned, has a data input channel 11 and a storage unit 12. The data supplied to input channel 11 are being stored in unit 12. This store 12 may include a paper tape punching machine providing perforations on a paper roll in response to signals supplied to the unit through the input channels 11. This, however, is mentioned here only by way of example, as utilization and subsequent processing of the data received by the acquisition unit 10 is not part of the invention and can be of any kind, any type as conventionally used. The CDA unit 10 may well be an input-output device of a computer.

In the most simple configuration the channel 11 may consist of a single data line receiving, for example, digital signals in the form of individual pulse bits. In this case all data supplied to the unit 10 are strictly in a serial-by-bit format. Alternatively the channel 11 may include several lines in case data such as digital data are supplied by the individual sources in a format which can be described as serial-by-character, parallel-by-bit; the bits concurrently provided constituting a character.

If necessary, the store 12 may include a format converter in order to convert the format of the signals as supplied to the channels 11 into the format with which said data are to be recorded or stored. Where very high speeds are not required, the data may thus be provided through a single line in a serial-by-bit character format, and the input for the store 12 may then include a serial to parallel connector. Where the data are being supplied at a rather slow rate, but can be processed rapidly, the channel 11 may have several parallel lines for receiving characters in a parallel-by-bit format. The store 12 may then include a parallel-to-serial format converter operating accordingly at a higher rate than the character supply rate.

In any event the input channel 11 has as many data lines as are needed for receiving information signals should such signals be supplied and received in a parallel type format. The input channel 11 does not distinguish in any manner among the several sources from which the data are received. The CDA unit 10, furthermore, may include a counter 13 which counts the number of bits or characters received by the input channel 11. In many cases, data are supplied in blocks, i.e., each block, for example, comprising a particular but not necessarily constant plurality of bits and/or characters. The counter 13 counts the number of characters of a block, and the resulting count number is then treated as a character or a plurality of characters to be passed also to the store 12 at the end of each block.

The characters as received by the input channel 11, considering here the case of a plurality of bits per character, may individually include a so-called parity bit. A unit 14 is coupled to channel 11 to provide for a parity check of each character in order to find errors in the data received. Should such error occur, the parity check unit 14 feeds a corresponding signal to an internal control unit 15 which signal is to be processed in a manner that the CDA unit provides for certain subsequent steps. For example, in response to such a parity error the controls unit 15 may provide immediately or at the end of a data block a particular control signal or group of control signals to be described more fully below.

The CDA unit will, furthermore, include a code detector 16 responsive to a code signal, i.e., a specific bit group or character or character group with which the several sources signal the end of a block or the end of the present supply.

The data supply is provided by a plurality of individual stations 1, 2, 3 . . . *n*, etc., each of which includes a data supply source. There can be any number of such stations whereby in accordance with the present invention there is no principal restriction as to the number. The only practical restriction is that since each supply source can communicate with the acquisition unit 10 only one at a time, the number of supply sources should not be too large as then each individual station can communicate only too rarely with the CDA unit. This, however, depends on the individual case and here particularly on the expected rate for demands by each station for service. It is important only that in accordance with the principles expounded here there is no restriction.

There is now provided a data cable 21, having again as many individual lines as, for example, there are bits in a character; or more generally, there are many lines as information in parallel is to be or can be provided by any of the sources in the stations. This data cable 21, i.e., the individual data lines thereof is connected with one end to the input channel 11, i.e., the individual lines thereof and in a permanent manner as far as duration of operation of the system as a whole is concerned. The data cable 21 now leads from the channels 11, i.e., from the input of the CDA unit serially to and along the several data supply sources, i.e., it leads first to the station 1, from there to the station 2, etc. The end of the cable 21 is only provided with a normal electric terminator or an impedance path to the electrical return path. The return path may be one extra line of the data line system or simply ground. In any event the end of the cable is provided in a manner permitting extension of the system by lengthening it for adding additional stations. Each individual station has now its data output lines connected to the lines of the data cable 21, so that each of the sources feeds the data to the same cable 21 to be passed on to the same input channels 11. If it is said, that each station has its data output lines connected to the data lines of cable 21, such connection may be not necessarily be a permanent one but there may be interposed switches which close only when the particular station issues data while the respective switches of the other stations are open to prevent crosstalk.

The operative connection, i.e., the sequencing of the stations 1 through *n* for individually supplying data to the data channel 21, is carried out in semi-autonomous manner and through a control cable 22. By means of cable

22 the CDA unit communicates with the stations and the stations with each other for an orderly and efficient sequencing operation. A station which has just supplied data and which has terminated such a supply now controls the operative connection of the next station to the data supply line 21. Additionally, the control cable 22 extends into the controls unit 15 of the CDA unit 10 for purposes of providing thereto and receiving therefrom control data. The control cable 22 leads in a similar manner as the data cable 21 from the unit 10 past the individual stations, and each of the individual control lines which are included in the control cable 22 are connected to the several stations. Therefore, pulse signals provided by and flowing through the lines included in the control cable 22 may be received by each station but the effect thereof will depend on the operative state of each individual station.

In practice the cables 21 and 22 together will form a multiwire cable or line leading from the CDA unit 10 sequentially to and past the several stations. It should be noted at this point that the sequence of connection of the individual stations to and along the cables 21 and 22 does not establish, per se, a priority sequence in general, but only inferentially during the very first cycle of operation. During the first cycle a station closer to the CDA unit 10 will be called on for supplying its data to the CDA unit 10 earlier than stations more remote therefrom, but during continuous operation the interrogation and communication operates strictly cyclically in that after the last station *n* has supplied data the first one is being called again on, etc. If, however, the cable 22 includes lines for passing addressing codes to the individual stations, the controls unit 15 can establish a priority sequence and call cycle which is entirely independent from the sequence of connection. The system, however, does not require such addressing lines for proper operation.

In order to more fully understand the operation of the system, reference is now being made to the FIG. 2 showing the control section of an individual station. The several data supply sources may differ in type, structure, etc., but the control sections will be similar in all stations. Each station, therefore, includes four relays designated with reference characters A, B, C and D. Indicator lamps are connected across each relay, to light up when the respectively associated relay is energized. Each station includes a data source proper, DS, which may be of any type, for example, a Teletype machine, a typewriter, a punched card reader, a measuring instrument or the like. Details thereof are not essential but one can see that this data source DS is connectible through relay contacts such as $b_5$ and $b_6$ to the bit lines 21–1 and 21–2 pertaining to data cable 21. As will be described more fully below these contacts pertain to relay B of the station. It is presently assumed that the data be supplied in forms of characters each having two bits.

The control signal cable 22 comprises the following individual lines. A line S receives from all stations a signal at least at the time when a station is about to supply data. A line CP receives from the CDA unit 10 clock pulses and passes them to the respective data sources DS of the several stations. These clock pulses may be effective only in the station actually issuing data so that the clock pulses in the line CP determine the rate with which the CDA unit desires to receive the data from the source. This obviates the necessity for providing clocking signals in each individual station. It may be convenient to use the clock pulses in a source DS even when not supplying data, just for its own operation, for example, during accumulation of data to be transmitted subsequently. If such is not desired, and if such clock pulse transmission may even cause interference when supplied outside the period during which data are supplied, then an additional contact *b*- may govern the connection of the line CP to the DS unit, to close when contacts $b_5$ and $b_6$ are closed.

The line P is the line over which the progression is controlled with which cyclically sequentially and progressively the several stations can provide data to the CDA unit 10. The line P is also connected to the controls unit 15 because in order to close the cycle the unit 10 has to provide signals to the line P at particular times. However, normal progression during a cycle is not controlled from the CDA unit 10, but the stations communicate with each other via line P as will also be described more fully below.

Three lines AL, BL and CL are also part of the control cable 22. They are individually connected respectively to one side of the relays A, B and C. The connection runs through diodes, so that the potential in the several lines AL, BL and CL will be exclusively determined from the controls unit. The relays A, B and C thus cannot feed back unwanted potential into these lines. The signals supplied into the lines AL, BL, CL from the controls unit 15 in CDA unit 10 are fed to all of the several relays A, B and C respectively in all of the stations, but they are effective only in a particular manner depending on energization state of the several relays in a station. Normally the lines AL receives positive potential, with negative potential occurring in form of short control pulses. The line BL receives negative potential, either continually except for short positive control pulses or only during a particular mode. The line CL receives either no potential or positive potential with negative control pulses occurring for short durations.

The control cable 22 may, but does not have to, include power lines designated in FIG. 2 with reference characters + and −. The inclusion of these lines into the cable may be a matter of design convenience so that one single cable leads from station to station and thereby connects also the stations electrically in parallel for purposes of supplying driving voltage to them or at least to the control sections thereof. This may be advisable if the stations or some of the stations operate with A.C. and/or at a different voltage level. Inclusion of these supply lines + and − obviates the necessity of providing a low D.C. power supply section in each station just for the controls thereof. Alternatively each station may have its own power supply which may be advisable if each station has easy access to D.C. power at the same level.

Finally the control cable 22 may include a plurality of addressing lines (not shown) for connection to the input side of a decoder DC in each station. The addressing lines, etc., receive addressing codes from the CDA unit 10 for addressing an individual station. The decoder DC of a station responds only to the addressing code assigned to the station. This addressing system may strictly depend on the general setup of the entire system and is not essential. In any event, if such addressing lines are provided for, then the output of the decoder DC provides a signal to a line $t$ whenever the particular station is being addressed by the CDA unit 10.

Each station will always be in one of the following five modes. First, the resting or disconnects mode; second, the waiting mode; third, the operate or transmission mode; fourth, the progression control mode; fifth, the error mode. The resting or disconnect mode is present when the station is inactive. The mode is actually equivalent to a complete disconnection of the station from the cables. Also, no distinction is to be made whether or not power has, in fact, been turned on or off. The resting or disconnect mode is particularly characterized by the "off" or deenergized state of all its relays and can therefore be symbolically described as being $\overline{ABC}$.

The waiting mode is established when the station desires communication with the central data acquisition unit 10 but is presently not able to do so as the CDA unit is otherwise occupied, for example, because it receives data from different sources and/or because there are other stations which, in the present cycle of interrogation, have a higher priority. The waiting mode is identified by a state $A\overline{BC}$. The stations which are in the waiting mode at any time establish the "waiting line" and they will be called on for transmission of data in the sequence of connection to the cables 21 and 22. In the operate or transmission mode the station feeds data to the CDA unti 10 to the exclusion of others. The operate mode is characterized by a mode or state signal $AB\overline{C}$. The progression control mode occurs when the source of a station has terminated the feeding of data to the CDA unit. The turnover process of the communication from the present station to the station next in the "waiting line" is controlled by a station when in this particular mode which is characterized by state $\overline{A}B\overline{C}$. The error mode occurs when the CDA unit has sensed the existence of an error and it demands from this station repetition of the data which contained that error. The error mode is characterized by the state $\overline{AB}C$.

The resting mode finds the four relays A, B, C and D of a station unenergized and their contacts are in the illustrated position. In particular, the contacts $a_1$, $a_2$, $a_3$, $a_4$, $b_1$, $d_1$, $d_2$, $c_1$, and $c_2$ maintain the relays A, B, C unenergized irrespective of any signals flowing in the lines P, AL, BL and CL. If communication of the station with the CDA unit is desired, relay D is energized. This can be done in several ways but not all of them have to be provided for. For example, a manually operable pushbutton T can be pressed to connect the relay D between appropriate terminals of power supply lines + and −. Additionally or in the alternative, a command signal in the line $t$ may receive positive voltage pulse from the decoder DC or from any other source resulting, for example, from automatic operation of the station and the source DS itself.

The selective issuance of addressing signals by the CDA unit 10 into the addressing lines establishes on part of the CDA unit a particular priority. If initially, for example, the CDA unit sets all the various address signals sequentially into the addressing lines, and repeats same at the beginning of each interrogation cycle, then all stations will continuously and automatically be interrogated and placed in a position to sequentially provide data to the CDA unit. However, this automatic addressing system does not have to be provided for at all and instead, interrogation may strictly occur in the response to manual operation of the button T.

As relay D energizes the system is shifted into the waiting mode $A\overline{BC}$, thus requiring energization of relay A. Relay D closes contact $d_1$ so that the relay A energizes through contacts $b_1$ and $c_1$ which remain in the illustrated position. Relay C is temporarily disconnected from the command line CL which is of no importance for the operation at this time; the contact $d_2$ is provided for other purposes. Relay D is energized only as long as button T is pressed or as long as the control signal in line $t$ persists.

As relay A energizes it first closes its holding contact $a_1$ to establish its own holding circuit. By closing contacts $a_2$ and $a_3$ relay B is operatively connected between the negative power line and the command line P for the progression control. The contact $a_3$, when closing, renders in particular relay B independent from any signal level variations in the line BL. The contact $a_4$ changes its position as a preparatory measure for relay C, but relay C does not respond at that time. The contact $a_5$ opens to prevent the propagation of any signal in line P, if coming from the left in the drawing, to stations connected to the system, i.e., to the cables 21 and 22 to the right of the station presently described. This establishes the priority of the station when in the waiting mode over stations to the right, and thereby a definite direction for the cyclic process of sequentially connecting stations desirous of transmitting data to the CDA unit 10 is established.

The station may remain in the waiting state for a period of indefinite duration but due to the cyclic nature of the operation of the entire system, sooner or later a positive signal wall appear in the line P. That signal comes from a station to the left and finds an electrical return path to the negative power line through the relay B so that relay B is energized. Thereby the operate mode is established. Contact $b_1$ changes position so that subsequently relay A comes under control from line AL as far as positive potential is concerned, i.e., the alternative direct connection to the positive power line is interrupted as far as relay A is concerned. Opening of contact $b_2$ additionally separates the stations to the right from the command line P. It should be noted that contact $a_5$ can be dispensed with, if the relay B of the present station has a particular response time and if, in the next station connected to the cables and to the right of the present station, the B- relay thereof has a somewhat longer response delay, the B- relay of the next following station having a still longer response delay, etc. or if various stations are spaced in larger distances. Thus its signal in line P will trigger the relay B of the respective station closest to it and to its right.

Contact $b_3$ closes to apply a positive potential to the signaling line S which, in fact, signals to the CDA unit 10 that the present station, particularly its source DS, is ready for a supply and transmission of data.

The postive signal in line P which triggered the relay B may have come from a station which previously delivered data to the CDA unit and was in the progression control mode; this mode will be described more fully below. Pursuant to this progression control a station in that mode delivers a positive signal into the line P.

A second posibility exists that the positive signal in line P which shifted the present station into the operate mode originated with the CDA unit 10 itself. This will always be the case if the station decsribed is station 1 or if no other station closer to the unit 10 than the present one was in the waiting mode.

Proceeding now with the description of the operate mode, the relay B of a station in that mode holds over its own contact $b_1$ beyond the period of positive potential in the line P. The contacts $b_2$ and $b_3$ have already been described. Contact $b_4$ closes which is a preparatory step for the progression control to be carried out at the end of the operate mode. The contacts $b_5$ and $b_6$ connect the data source DS of the station, i.e., the respective output lines thereof to the bit channels 21–1 and 21–2 respectively pertaining to the data channel or cable 21.

The control unit 15 in the CDA unit 10 causes clock pulses to be supplied to the line CP which clock pulses will be furnished by the clock in unit 15, continuously, but they are now effective directly in the source DS so that the source DS supplies the data to the bit or data cable at a rate determined by these clock pulses. As stated above, another contact on relay B may restrict the feeding of the clock pulses to the unit DS to the periods when relay B is energized.

The data transmitted may include a special code which signals to the CDA unit that the station, i.e., the source DS has temporarily exhausted its data supply so that at present no further communication is needed between the present station and the CDS unit. The decoder 16 in the CDA unit responds to this code and causes the controls unit 15 to issue a negative or ground signal into the line AL. In fact, the decoded and amplified end-of-data-transmission signal code may directly be used to supply this temporary nonpositive control signal for line AL. This control signal will affect only the particular station in the operate mode. A station in the waiting mode has its relay A energized over the contact $b_1$ of the respectively unenergized relay B in such a station. In the present station for which the operating mode is being described, rėlay B is energized so that its relay A is connected to receive only the postive source of voltage potential as supplied by the line AL. Thus, a negative signal or ground signal in that line AL causes relay A to be deenergized.

As relay A deenergizes, its contacts $a_1$, $a_2$, $a_3$, etc., change position accordingly. The opening of the contacts $a_2$ and $a_3$ has no immediate effect as relay B continuously holds over contact $b_1$ on the one hand and through the line BL, which has negative potential, either permanently or at least from the time the CDA unit 10 provides the negative control pulse into line AL. Thus, relay B comes now under control of the signal in line BL. It will be recalled that when relay B is the only one energized in a station, that station is then in the progression control mode. The position change of contact $a_4$ applies positive potential through closed contact $b_4$ to the line P. The contact $a_5$ has closed previously, but the contact $b_2$ is still open, so that a positive potential supplied through the contact $a_4$ to the line P is effective in that portion of line P only which extends to the right of the station leading to stations more remote from the CDA unit. However, the still open contact $b_2$ prevents positive potential from being supplied to the left-hand portion of the line P. The particular station next in the "waiting line" is the one which by virtue of the particular connection chosen is the next one to the right in the waiting mode. That may be the next one directly one the line, but that is not necessarily so. Thus, the particular station next in the "waiting line" and to the right of the present station will be called on by the positive command pulse in line P, and its relay B will respond. Should the station, as presently described, be the last one on the cable line or should there be no other stations in the waiting state to the right of the one presently described, then no relay B anywhere in the system responds to the signal in line P. Some time after the CDA unit 10 applies the nonpositive pulse to line AL, for example, one or several clock pulse periods thereafter, the CDA unit lets the BL line go positive or ground, i.e., nonnegative, to terminate the progression control mode. If the progression control as successful, in that another station to the right is now in the operate mode, then a positive signal will persist in line S even though relay B of the present station has deenergized. If the line S goes nonpositive at the time the CDA unit issued the nonnegative signal into line BL, then the progression control was unsuccessful and no other station to the right is in the operate mode. Thus, in order to start a new cycle the CDA unit 10 must apply a positive pulse to the line P directly, whereupon the station closest to the CDA unit 10 and in the "waiting line" will shift into the operate mode, signaling the fact so the line S and separating the remainder of the system from the P line by opening its contact $b_2$. The nonnegative signal in line BL can persist beyond the period required for terminating the progression control mode in a station. Such persistence will not effect any other station in the operate state as its B relay remains energized or energizable by operation of the then respectively energized A relay. In the present station, the A relay was deenergized at the end of the operate mode, so that the negative signal in the line BL inevitably causes relay line B to be deenergized shifting the station now into the rest or normal state. The station, therefore, is deactivated and will be called on for supplying data only after it has again been placed into the waiting mode by any of the means described above.

If, during the operate mode of a station, the CDA unit 10 discovers an error in the transmitted signal, for example, if the parity check unit 14 has discovered a parity error, it issues a negative signal into line C. That may occur right when the error is being detected; if negative potential is not normally prevailing in line BL, it must accompany the error signal in line C. The relay C is energized now from the line CL to the positive power line over the contacts $d_2$, $a_4$ and $b_4$. The contact $c_2$ closes and establishes an own holding circuit. Simultaneously the contact $c_1$ goes in the other position, whereby the relay A is deenergized. In this moment the system shifts into an intermediate state, which is not a separate mode, i.e., the progression control mode with energized relay C. This mode is terminated by a nonnegative signal in line BL as before whereafter the system goes directly into the error mode $\overline{ABC}$ in which only relay C is energized. This provides a visible representation at the station (lamp across relay C) that the previous transmission resulted in error. As it may have been only a transmission error, the station may simply be placed into the waiting mode again by appropriately energizing relay D which terminates the error mode (opening of contact $d_2$) and establishes the waiting mode. The station will thus be called on during the next cycle and the same data can be transmitted. If again there is an error, then the situation be dealt with appropriately, for example, by checking on the data, etc.

One can see that the control or command line AL and BL are needed only when a station is not equipped with circuit means to terminate operate and progression control modes by its own operation. This is well possible. On the other hand, it may be more economical to provide the system as described, because cables have to be run from station to station anyway and it may provide to be more economical to use just those two additional cables, rather than an autonomous control of these modes by a station itself.

The invention is not limited to the embodiments described above but all changes and modifications thereof not constituting departures from the spirit and scope of the invention are intended to be covered by the following claims.

What is claimed is:

1. A data acquisition system, comprising:
- a central acquisition unit for receiving signals representing data;
- a plurality of individual stations respectively including data supply sources for providing information signals;
- at least one data line, the number of data lines depending upon the data format and being independent from the number of stations, and connected to all stations to receive data in parallel form all the souces in the respective stations;
- control connection means extending between all stations of the plurality and in particular sequence of connection;
- a control circuit in each station and connected to the connection means to enable the respective station for having its source supply data to the data line or lines in response to receiving a progression control signal through the connection means from a station on the connection means in one direction in relation to the station to which the respective control circuit pertains, and to issue a progression control signal into the connection means and in the other direction, for reception by the respective control circuit of a station on the connective means in that other direction and having data available for supply; and
- means included in each control circuit to permit propagation of the progression control signal in the other direction when receiving it from the one direction and when not having data available for supply, but inhibiting such propagation when having data available for supply.

2. A system as set forth in claim 20, said central acquisition unit issuing control signals for controlling the timing of the supply of data.

3. A system as set forth in claim 20, the connecting means including a progression control line into which either station having terminated its operate mode issues a control signal for placing another station into the operate mode, so that at least some of said stations are placed into the operate mode in a particular sequence.

4. A data acquisition system comprising:
- a central acquistion unit for receiving signals representing data and for issuing control signals for controlling the timing of the supply of data;
- a plurality of individual stations respectively including data supply sources for providing information signals and having individual modes including a waiting and an operate mode, the source of either station when the operate mode being capable of providing information signals;
- first means for individually establishing the waiting mode in said stations;
- second means for establishing the operate mode in one of said stations in the waiting mode in accordance with a particular pattern of station sequencing and upon termination of the operate mode in another one of the stations; and
- connecting means including as many data lines as distinguishing information signals are supplied by either source in parallel, the connecting means leading from the central acquisition unit past all said stations in a particular sequence, the sources all being connected to said connecting means to feed information signals into the same data lines, the number of data lines being independent from the number of sources connected thereto.

5. A system as set forth in claim 4 comprising in addition:
- second connecting means connected to be responsive to said control signals for feeding the control signals to all said stations for control thereof in dependence upon the mode of each individual stations, the number of lines for the control signals being independent from the number of stations connected thereto.

6. A system as set forth in claim 4, the second means being private to each station, one of said modes being a progression control mode established in the station at the end of operate mode for controlling the establishing of the operating mode of the station next along said connecting means and in the waiting mode.

7. A data acquisition system comprising:
- a central acquisition unit for receiving signals representing data;
- a plurality of individual data supply sources, there being mean for interconnecting the sources for being progressively, cyclically enabled by each other for supplying data; and
- a common data line connected to all said sources independently from the number thereof for receiving data from the respectively enabled one of such sources and serially from all said sources, the data line feeding all data as received from either source to said central acquisition unit.

8. A system as set forth in claim 7 including a plurality of control lines connected between the central acquisition unit and all said sources for receiving control signals from the central acquisition unit and supplying same to all said sources.

9. A system as set forth in claim 7 said central acquisition unit including means for generating control signals associated with a data block as supplied by either source.

10. A system as set forth in claim 7 characterized in a counter for counting data signals received by the central acquisition unit from either of said sources for generating a control signal in response to the count result.

11. A system as set forth in claim 7, the central acquisition unit including means for testing the data as received for feeding said clock signal to said data supply sources for controlling the rate of supply.

12. A system as set forth in claim 7, the central acquisition unit including means for testing the data is received from said source and including means issuing a particular control signal in case of error of the data as received; and
- a command line conected for receiving said error signal and further connected for feeding said error signal to all said sources, each source including means responsive to said error signal only when having supplied the data resulting in the production of the error signal by the central acquision unit.

13. A data acquisition system, comprising:

a central acquisition unit for receiving signals representing data;

a plurality of individual stations respectively including data supply sources for providing information signals and having individual modes including an operate mode during which information signals are supplied by the source of the station and a waiting mode indicative of readiness of the respective station to supply data;

a cable including a plurality of data lines and at least one control line, there being as many data lines as distinguishing information signals are supplied by either of the sources in parallel independent from the number of stations of the plurality, the cable leading from the control acquisition unit serially past all sources in a particular sequence; and means in each station connected to the control line, to control establishing of the operate mode of a station of the plurality when in the waiting mode, and in response to termination of supplying of data of a station of the plurality in the operate mode and in further response to absence of a station of the plurality in the waiting mode as connected to the cable between the station in the waiting mode and the station in the operate mode.

14. A system as in claim 13, including means in each station operating in response to a termination of data supply operation by the station and for transmitting a signal into the control line, there being means operative in each station, capable of receiving and processing the signal only when the station constitutes constituting the next one on the cable in the waiting mode.

15. A system as in claim 13, including a plurality of control lines in the cable, the first one providing progression control in response to termination of supply by the station in the opposite mode to the next station on the cable in the waiting mode, the selection of this next station being independent from the control acquisition unit, there being an additional control line included in the plurality for transmission of control signals to all stations said transmission being under operative control of the central acquisition unit, to be operative only in the station currently in the operate mode, and to control the supply of data therefrom including the timing rate of data supply.

16. A system as in claim 15, the central acquisition unit providing control signal to establish the operate mode in a station of the plurality in the waiting mode closest to the unit if upon termination of data supply of a station in the operating mode no other station, if any, to the end of the cable is in the waiting mode.

17. A system as in claim 13, the central unit including circuit means to provide a control signal, each station including means connected to another control line as extending from the circuit means of the unit to all stations and being connected to all stations in sequence as all stations are connected to the one control line, the additional control line provided to receive the control signal from the unit to terminate the operate mode in a station of the plurality, each station further including means providing a sequencing control signal in response to the terminating signal and setting the sequence control signal into the one control line to be effective only in one direction therein in relation to the station providing the control signal, to establish the operate mode in a station of the plurality in the waiting mode closest to the station providing the control signal in that direction.

18. A data acquisition system, comprising:

a central acquisition unit for receiving signals representing data;

a plurality of individual stations respectively including data supply sources for providing information signals, each station of the plurality further including circuit means inhibiting or enabling the providing of such signals by the respective source;

at least one data line connected to each station of the plurality so that all stations, one at a time, feed data into the same line or lines for reception by the central unit; and a circuit including control lines extending between the respective circuit means in the stations of the plurality and in a particular sequence of serial connection, for controlling the sequence-of-enabling the stations for supplying data independently from the central station as to the sequence and in dependence upon the sequence of the serial connection of the stations to the control lines.

19. A system as in claim 18, including additional circuit means connected between the unit and the stations of the plurality and operating in response to timing operation of the unit to control timing of data supply.

20. A data acquisition system comprising:

a central acquisition unit for receiving signals representing data;

a plurality of individual stations respectively including data supply sources for providing information signals and having individual modes including an operate mode during which information signals are supplied by the respective source of any of the stations when in the operate mode;

and, connecting means including a plurality of control lines and data lines, there being as many data lines as distinguished information signals are supplied by any of the data sources in parallel, the connecting means leading from the central acquisition unit serially past all sources in a particular sequence, the sources all being connected to said connecting means to feed information signals into the same data lines, the control lines connected to be responsive to said control signals for feeding control signals to all said stations for control thereof in dependence upon the mode of each individual station, the number of data lines and control lines being independent from the number of sources connected thereto.

References Cited

UNITED STATES PATENTS

| | | | |
|---|---|---|---|
| 3,094,610 | 6/1963 | Humphrey et al. ____ | 340—172.5 |
| 3,200,380 | 8/1965 | MacDonald et al. __ | 340—172.5 |
| 3,226,694 | 12/1965 | Wise _____________ | 340—172.5 |
| 3,302,182 | 1/1967 | Lynch et al. ______ | 340—172.5 |
| 3,421,150 | 1/1969 | Quosig et al. ______ | 340—172.5 |

PAUL J. HENON Primary Examiner

P. R. WOODS, Assistant Examiner